March 30, 1943.  T. K. WILSON  2,315,307
FISHHOOK
Filed April 24, 1941

Thomas K. Wilson.
INVENTOR

BY Victor J. Evans & Co.
ATTORNEYS

Patented Mar. 30, 1943

2,315,307

UNITED STATES PATENT OFFICE 2,315,307

FISHHOOK

Thomas K. Wilson, Portland, Oreg.

Application April 24, 1941, Serial No. 390,196

3 Claims. (Cl. 43—27)

My invention relates to new and useful improvements in fishing apparatus.

An important object of my invention is the provision of a fish hook construction that is uniquely adapted to assure substantial longevity of the hook.

It is a well known fact that when a fish hook is pulled through the water, and particularly salt water, the corrosive and abrasive action of the water on the hook and its appurtenances is essentially rapid. Experience teaches that a hook constructed in the conventional manner will generally last no longer than three days when used in salt water. It is, therefore, another object of my invention to provide a fish hook construction wherein the corrosive action of the water and the abrasive action effected by rubbing of the looped end of the hook against the supporting member will be reduced to a minimum.

Other objects and advantages of my invention, will be apparent during the course of the following description.

Figure 1:
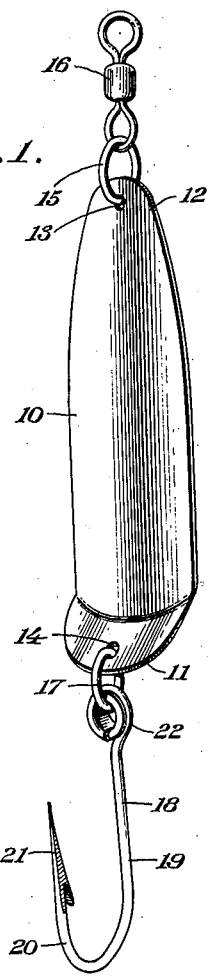
Figure 2:
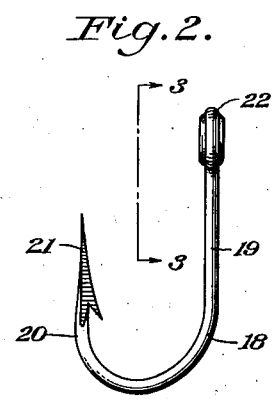
Figure 3:
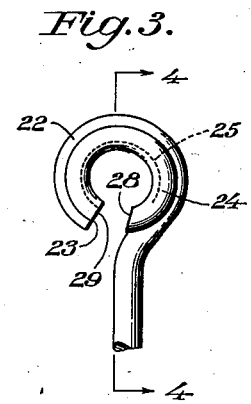
Figure 4:
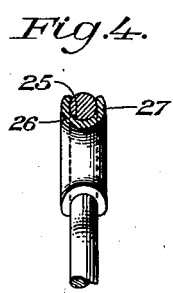
Figure 5:
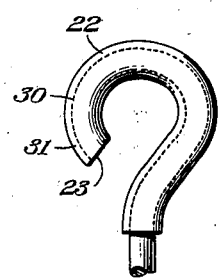

In the drawing, forming a part of this specification, and wherein like numerals are employed to designate like parts throughout the same, Figure 1 is a perspective view of a fish hook construction embodying my invention, Figure 2 is a side elevation of the fish hook, Figure 3 is a fragmentary front elevation taken on the line 3—3 of Figure 2, Figure 4 is a vertical sectional view taken on the line 4—4 of Figure 3, and Figure 5 is a fragmentary front elevation of a modified form of the invention.

In the accompanying drawing, wherein for the purpose of illustration, is shown a preferred embodiment of my invention, the numeral 10 designates a spoon of conventional shape and construction. The spoon comprises a metallic plate of essentially oval formation in plan that is bent transversely for its entire length, and which tapers slightly from the hook receiving end 11 toward the leader receiving end 12. The opposite ends of the plate are provided with openings 13 and 14, the opening 13 being adapted to receive a ring 15 which, in turn, carries a swivel joint 16 and the opening 14 receiving a ring 17 which, in turn, carries the fish hook 18.

The hook 18 is of conventional shape having a shank 19 formed at its lower end with a hook 20 terminating in a barbed prong 21. The upper end of the shank is looped, as at 22, and the distal end 23 of the loop is spaced slightly from the shank to permit the supporting ring 17 to be inserted into the said loop. The hooks become useless in a relatively short time by reason of the fact that the abrasive and corrosive action of the water and the rubbing of the loop against the ring effects essentially rapid wearing of the loop. Also, the hooks are frequently broken or twisted when they become snagged in projections from the river bed or ocean bottom. For these reasons, it is necessary that the hooks be frequently replaced and the end 23 is, therefore, formed in spaced relation with the shank to permit the ring 17 to be moved therebetween and into the loop which end is then pressed toward the shank to close the space therebetween and to securely hold the ring therein.

It is my thought to provide a suitable sheath or sleeve that may extend along the looped portion of the hook for its entire length and which will be interposed between the normally contacting surfaces of the loop and ring to prevent wearing of the said looped portion. This sheath, designated by the numeral 24, comprises an elongated metallic strip transversely and longitudinally bent to snugly fit within the looped portion 22. This construction provides an essentially circular member having its ends spaced apart a distance equal to the distance between the end 23 of the looped portion and the shank 19. The outer peripheral groove 25 of the sheath receives the looped portion 22 and the side walls 26 and 27 extend upwardly in embracing relation with the looped portion, as best illustrated in Figure 4. The end 28 of the sheath is beveled to abuttingly contact the end 29 thereof when the coextensive ends 23 and 29 are pressed in the direction of the shank.

The sheath may be formed of any suitable material that is sufficiently abrasion resisting and which is inherently yieldable to permit bending of the same with the looped portion 22 when the end of the looped portion is pressed against the shank. The abrasion resisting qualities of the sheath will prevent the essentially rapid wear of the looped portion and will aid in preventing the corrosive effects of the salt water from essentially rapidly eating through the metallic loop.

Figure 5 illustrates a construction similar to that shown in Figure 3. The sheath, designated generally by the numeral 30 is of tubular formation to completely enclose the looped portion of the fish hook. The distal end 31 thereof is similarly coextensive with the distal end 23 of the looped portion and the end 23 is normally spaced from the shank in the manner and for the purpose hereinabove set forth. The purpose and utility of this form of the invention is so similar to the form hereinabove described that no further explanation is thought to be necessary.

It is to be understood that the form of my invention, herewith shown and described is to be taken as a preferred example of the same, and that various changes in the size, shape and arrangement of parts may be resorted to without departing from the spirit of my invention, or scope of the appended claims.

Having thus described my invention, I claim:

1. A fish hook having a shank terminating in an arcuately curved portion, the end of which curved portion being disposed in slight spaced relation with the shank, and substantially tubular abrasion resisting sheath receiving the inner periphery of the arcuately curved portion of the shank, said sheath being inherently yieldable and extending the full length of the curved portion and terminating at the mentioned end thereof in spaced relation with the shank whereby a ring may be inserted into the curved portion of the sheath and the spaced ends of the curved portion of the hook and sheath pressed in the direction of the shank to securely hold the member therein.

2. A fish hook having a shank formed with a looped distal end portion, the extremity of which looped portion being disposed in spaced relation with the shank to permit a ring to be inserted into the said looped portion, and a substantially tubular abrasion resisting sheath receiving the inner periphery of the looped portion, said sheath being inherently yieldable and extending from the shank to the spaced distal end of the looped portion, the end of the sheath adjacent the shank being beveled to abuttingly engage with the distal end of the sheath and looped portion when the same are pressed in the direction of the shank to hold the supporting member securely positioned within the said looped portion, the said sheath being effective to prevent the supporting member from wearing through the looped portion of the hook by continual rubbing of the contacting surface of the looped portion with the said supporting member.

3. A fish hook having a shank terminating in an arcuately curved portion having its end disposed a slight distance from the shank forming an eye with an open lower end, and a circular sheath of yielding material embracing the inner face of the eye and frictionally retained therein against movement by tension of a fishing line thereon, said sheath having a cut-away portion corresponding with the opening in the eye, whereby the sheath may be rotated in the eye by hand overcoming the frictional engagement of the same with the eye to close the opening therein.

THOMAS K. WILSON.